United States Patent

Spiegel

[11] Patent Number: 5,992,515
[45] Date of Patent: Nov. 30, 1999

[54] TRANSMISSION FLUID COOLER-BYPASS UNIT FOR A TRANSMISSION FLUID COOLING SYSTEM

[75] Inventor: Richard V. Spiegel, Beverly Hills, Mich.

[73] Assignee: Form Rite, Auburn Hills, Mich.

[21] Appl. No.: 08/737,261

[22] PCT Filed: Nov. 17, 1995

[86] PCT No.: PCT/US95/15085

§ 371 Date: Nov. 12, 1996

§ 102(e) Date: Nov. 12, 1996

[51] Int. Cl.$^6$ .......................... G05D 15/00; F16K 15/00; F01M 5/00; E03B 65/20

[52] U.S. Cl. .......................... 165/283; 165/283; 165/916; 137/539; 137/599.1; 184/6.22; 184/104.1; 184/104.3

[58] Field of Search ...................................... 165/916, 283; 137/539, 599.1; 184/6.22, 104.1, 104.3

[56] References Cited

U.S. PATENT DOCUMENTS

| | | | |
|---|---|---|---|
| 3,966,119 | 6/1976 | Harter et al. | 165/283 |
| 4,360,055 | 11/1982 | Frost | 165/38 |
| 4,456,310 | 6/1984 | Hayashi et al. | 303/10 |
| 5,165,468 | 11/1992 | Tajima et al. | 165/47 |
| 5,217,085 | 6/1993 | Barrie et al. | 184/104.1 |
| 5,403,042 | 4/1995 | Negron et al. | 285/12 |
| 5,564,317 | 10/1996 | Gilroy et al. | 74/606 |
| 5,575,329 | 11/1996 | So et al. | 165/167 |
| 5,595,213 | 1/1997 | Brown | 137/515.5 |

FOREIGN PATENT DOCUMENTS 813272  11/1936  France .

*Primary Examiner*—Ira S. Lazarus
*Assistant Examiner*—Matthew G. Pryor
*Attorney, Agent, or Firm*—Howard & Howard

[57] ABSTRACT

A transmission fluid cooling system includes a cooler-bypass unit having a banjo bolt relief valve. The banjo bolt relief valve includes a head portion and a body portion. A relief valve is incorporated into the body portion. A valve seat is formed between the head portion and body portion. A ball is biased against the valve seat toward the head portion by a spring within the body portion. When the transmission fluid is cool and viscous, pressure buildup in the head portion overcomes the spring bias of the ball against the valve seat, permitting the flow of transmission fluid through the cooler-bypass unit, bypassing the transmission fluid cooling unit.

10 Claims, 2 Drawing Sheets

TRANSMISSION FLUID COOLER-BYPASS UNIT FOR A TRANSMISSION FLUID COOLING SYSTEM

BACKGROUND OF THE INVENTION

This invention relates to a transmission fluid cooling system and more particularly to a cooler-bypass unit having a banjo bolt incorporating a relief valve.

Vehicles are typically equipped with transmissions that provide different speed ratios between the engine and the drive axles. A transmission typically generates a good deal of heat, and thus oil is circulated to cool the transmission components.

The oil in the transmission becomes quite hot during operation of the vehicle. Thus, the oil is typically routed to a cooling unit. The cooling unit cools the oil which is then returned to the transmission.

Typically, the transmission is spaced some distance from the cooling unit. As such, fluid lines, such as conduits or hoses must travel the distance from the transmission to the cooling unit. The oil travels between the transmission and cooling unit through the fluid lines.

When the engine is running, oil is continuously being moved to the cooling unit, and from the cooling unit back to the transmission. When the vehicle is cool, the oil is relatively viscous and does not flow quickly through the cooling unit. This causes back pressure on the supply line leading to the cooling unit. For this reason, some transmission cooling units have incorporated a relief valve for returning a portion of the transmission fluid from the supply line leading to the cooling unit directly back into the return line leading back to the transmission. In the past, the relief valve is installed between a T-connector in the supply line and a T-connector in the return line. The separate components result in an unduly high amount of fluid connections, and also additional parts which require additional assembly time.

The more fluid connections that are created in a transmission cooling system, the more places there are that could potentially leak. A transmission oil leak could be very damaging to the vehicle, and could lead to seizure of the transmission. Thus, the relatively high number of fluid connections is undesirable.

SUMMARY OF THE INVENTION

The present invention provides a transmission cooler-bypass unit for connection between the fluid supply line and fluid return line. The cooler-bypass unit includes a banjo bolt relief valve having a head portion and a body portion. A banjo bolt is a known type of fluid connection, but this invention incorporates a valve in the banjo bolt. The head portion is generally in the shape of a short cylinder having an inner annular cavity. The body portion is generally an elongated cylinder extending transversely from the head portion. A relief port provides fluid communication between the head portion and body portion. A bypass relief valve is incorporated within the body portion of the banjo bolt relief valve to regulate the flow between the head portion and the body portion. A valve seat is formed at the relief port between the head portion and the body portion. A ball is biased against the valve seat by a spring. Since the relief valve is incorporated into the banjo bolt, which is used to connect a fluid line to the transmission, fewer fluid connections are necessary.

An externally threaded hollow bolt is inserted through the head portion and threaded into the transmission case. The hollow bolt includes an axial bore and a transverse port in connection with the axial bore. The transverse port is aligned within the annular cavity and provides a connection between the axial bore and annular cavity. The hollow bolt provides means for connecting the fluid supply line to the head portion of the banjo bolt relief valve.

The body portion of the banjo bolt relief valve is in fluid communication with the transmission fluid return line. A return banjo bolt having a head portion and body portion can be used to provide connection of the banjo bolt relief valve body portion to the transmission fluid return line. The head portion of the return banjo bolt is connected to the fluid return line by a hollow bolt having an axial bore and a transverse port. If necessary, a bypass fluid line may be used to connect the body portion of the return banjo bolt to the body portion of the banjo bolt relief valve.

When the transmission fluid is cool and sufficiently viscous to form sufficient back pressure in the transmission fluid cooler, the increased pressure in the fluid supply line overcomes the spring bias on the ball against the valve seat, thereby permitting transmission fluid to flow directly from the fluid supply line to the fluid return line, bypassing the transmission fluid cooler. When the transmission fluid heats and becomes less viscous, the transmission fluid flows more freely through the transmission fluid cooler, decreasing the pressure in the fluid supply line and permitting the spring to bias the ball against the valve seat thereby preventing the transmission fluid from bypassing the transmission fluid cooler.

DETAILED DESCRIPTION OF A PREFERRED EMBODIMENT

Figure 1:
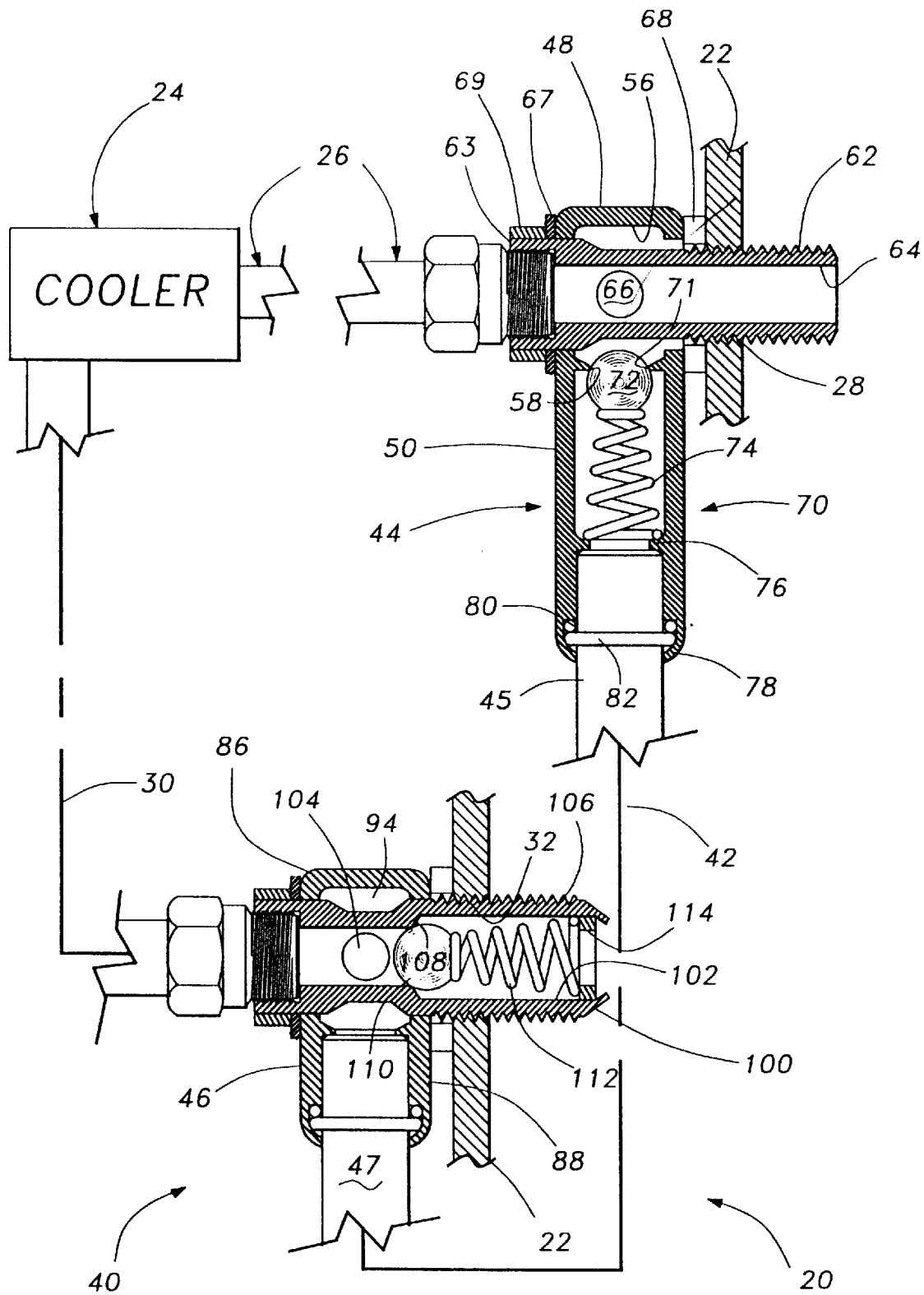
FIG. 1 is a schematic view showing a transmission cooling system according to the present invention.

A transmission fluid system 20 includes a transmission case 22 and a transmission fluid cooler 24, both shown schematically in FIG. 1. The wall of the transmission case 22 is shown broken away in two parts but could be two areas of the same wall of the transmission case 22. A transmission fluid supply line 26 carries transmission fluid from the fluid outlet 28 of the transmission case 22 to the transmission fluid cooler 24. A transmission fluid return line 30 carries transmission fluid back from the transmission fluid cooler 24 to a fluid inlet 32 of the transmission case 22. A known circulating system, such as a pump, is utilized to move the transmission fluid through supply line 26 to the transmission fluid cooler 24 and then to return transmission fluid through return line 30.

A transmission fluid cooler-bypass unit 40 is connected between the transmission fluid supply line 26 and fluid return line 30. If necessary, the cooler-bypass unit 40 may include an extended bypass fluid line 42, depending upon the locations of the supply line 26 and the return line 30. The cooler-bypass unit 40 has a banjo bolt relief valve 44 at a first end 45 and a return banjo bolt 46 at an opposite end 47.

Figure 2:
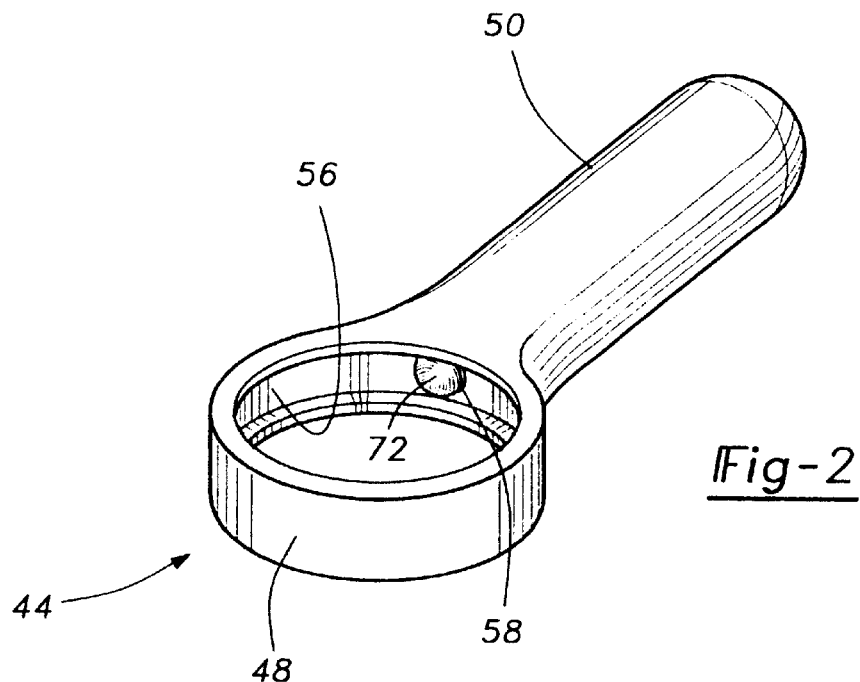
FIG. 2 is a perspective view of the banjo bolt relief valve shown in the transmission cooling system in FIG. 1.

As can be seen in FIGS. 1 and 2, the banjo bolt relief valve 44 generally includes a head portion 48 and a body portion 50. The head portion 48 is generally in the shape of a short cylinder having an inner annular cavity 56. The body portion 50 is generally an elongated cylinder extending transversely from the head portion 48. The banjo bolt relief valve 44 further includes a relief port 58 leading from the annular cavity 56 of the head portion 48 to the body portion 50.

Referring to FIG. 1, an externally threaded hollow bolt 62 is used to connect the banjo bolt relief valve 44 to the supply line 26 and the transmission case 22. The bolt 62 includes an axial bore 64 through its length and a transverse port 66 leading into the axial bore 64 at a generally mid-portion of the bolt 62. The bolt 62 includes an internally threaded outer end 63 of increased diameter. The bolt 62 is inserted through the head portion 48 of the banjo bolt 44 so that the transverse port 66 is in fluid communication with the annular cavity 56. The bolt 62 is then threaded into the fluid outlet 28 in the transmission case 22 and the outer end 63 is connected to the fluid supply line 26. A washer 67 seals the outer end 63 of the bolt 62 and the head portion 48 of the banjo bolt 44. Another washer 68 seals the head portion 48 of the banjo bolt 44 and fluid outlet 28 of the transmission case 22. The supply line 26 is connected to the outer end 63 of the hollow bolt 62 with a flare fitting and coupling 69 or other known connecting means.

The banjo bolt relief valve 44 further includes a bypass relief valve 70 within the body portion 50. A valve seat 71 is formed by the relief port 58 between the annular cavity 56 of the head portion 48 and the body portion 50. The banjo bolt is particularly well-suited as a valve since the port 58 provides a valve seat 71. A ball 72 is biased against the valve seat 71 by a spring 74, regulating the flow of fluid from the annular cavity 56 of the head portion 48 into the body portion 50. A spring stop 76 is provided within the body portion 50 to maintain the spring within the body portion 50.

A crimp 78 can be formed at one end of the body portion 50 to secure the banjo bolt relief valve 44 to the first end 45 of the bypass fluid line 42. The crimp is preferably formed over an o-ring seal 80 and annular bead 82 formed on the first end 45 of the bypass fluid line 42.

The return banjo bolt 46 at the opposite end 47 of the bypass fluid line 42 generally comprises a head portion 86 and a body portion 88. The head portion 86 is generally in the shape of a short cylinder having an inner annular cavity 94. The body portion 88 is generally an elongated cylinder extending transversely from the head portion 86. The body portion 88 of the return banjo bolt 46 is in fluid communication with the head portion 86. The body portion 88 can be secured to the opposite end 47 of the bypass fluid line 42.

An externally threaded hollow bolt 100 having an axial bore 102 and a transverse port 104 leading to the axial bore 102 is inserted through head portion 86 and threaded into the inlet 32 of the transmission case 22. The transverse port 104 and the annular cavity 94 provide fluid communication from the body portion 88 and bypass fluid line 42 to the transmission case 22 inlet 32.

A check valve 106 can be incorporated within the hollow bolt 100. The check valve 106 includes a valve seat 108 and a ball 110 biased against the valve seat 108 toward the transmission fluid cooler 24 by a spring 112. A spring stop 114 is provided within the hollow bolt 100 to secure the spring 112 within the hollow bolt 100.

It should be understood that the cooler-bypass unit 40 need not be mounted directly against the transmission case 22 as shown, but could be mounted anywhere between the supply line 26 and the return line 30. It should also be apparent that the bypass unit 40 could also be used for bypassing cooling units for other fluids such as power steering fluid or engine oil.

In operation, when the engine is first started, the transmission fluid is cool and viscous. The transmission fluid is pumped through the transmission case 22 into the transmission fluid cooler 24, but the cool, viscous transmission fluid does not flow easily through the transmission fluid cooler 24. This causes back pressure to build up in the supply line 26 and in the annular cavity 56 of the banjo bolt relief valve 44. When the transmission fluid is sufficiently cool, this pressure is sufficient to overcome the spring bias of the ball 72 against the valve seat 71, thereby permitting transmission fluid to flow into the body portion 50 of the banjo bolt relief valve 44 and directly into the transmission fluid return line 30 back to the transmission case 22, bypassing the transmission fluid cooler 24.

When the transmission fluid heats and becomes less viscous, the transmission fluid flows more easily through the transmission fluid cooler 24, thereby reducing the pressure in the fluid supply line 26 and the annular cavity 56 of the banjo bolt relief valve 44. When this occurs, the spring 74 moves the ball 72 against the valve seat 71, thereby sealing the annular cavity 56 from the body portion 50 of the banjo bolt relief valve 44 forcing the transmission fluid through the transmission fluid cooler 24.

Incorporating the relief valve 70 into the banjo bolt 44 reduces the number of components and connections required to installing cooler-bypass unit 40, thereby facilitating assembly and reducing the possibility of leaks of transmission fluid.

Figure 3:
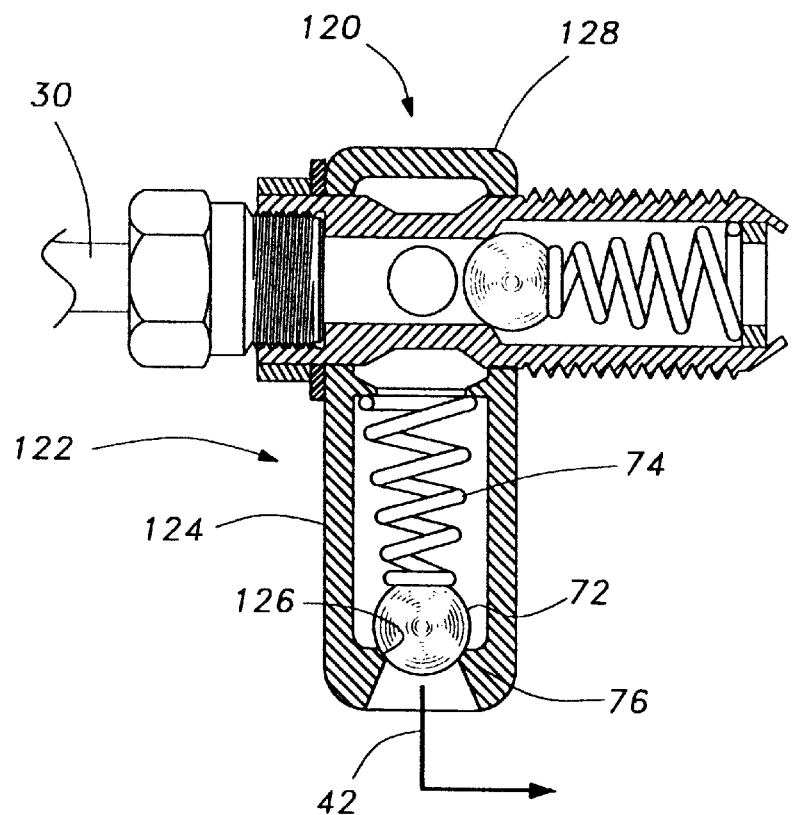
FIG. 3 is a schematic of an alternative banjo bolt relief valve connected to a return line and a bypass fluid line.

In an alternative banjo bolt relief valve 120 shown in FIG. 3, the relief valve 122 could be inverted within the body portion 124. In that case, the spring stop 76 acts as a valve seat 126. The spring 74 biases the ball 72 against the valve seat 126. The head portion 128 of the banjo bolt relief valve 120 connects to the return line 30 and the body portion 124 connects to the bypass fluid line 42. The relief valve 122 would prevent flow from the bypass fluid line 42 into the return line 30 until the transmission fluid in the bypass fluid line 42 reached a predetermined viscosity and pressure.

A preferred embodiment of the invention has been disclosed, however, a worker of ordinary skill in the art would recognize that certain modifications would come within the scope of this invention. For that reason the following claims should be studied to determine the true scope and content of this invention.

I claim:

1. A transmission fluid cooling system comprising:

a transmission case;

a cooling unit;

a supply line leading from said transmission case to said cooling unit;

a return line leading from said cooling unit back to said transmission case; and a cooler-bypass unit mounted between said supply line and said return line, said cooler-bypass unit including a supply banjo bolt connected to said supply line, said supply banjo bolt including a head portion and a body portion, said head portion in fluid connection with said supply line, said body portion in fluid connection with said return line, a return banjo bolt connecting said body portion of said supply banjo bolt to said return line, said return banjo bolt including a head portion and a body portion, said head portion in fluid connection with said return line, said body portion of said return banjo bolt in fluid connection with said body portion of said supply banjo bolt, said supply banjo bolt including a valve seat between said head portion and said body portion, said supply banjo bolt further including a ball within said body portion biased toward said head portion against said valve seat, said ball becoming unseated from said valve seat when pressure in said supply line exceeds a predetermined pressure to allow fluid to pass directly from said supply line to said return line, thereby bypassing said cooling unit.

2. A transmission fluid cooling system as recited in claim 1, further including a bypass line connecting said body portion of said supply banjo bolt to said return line.

3. A transmission fluid cooling system as recited in claim 1, further including a spring biasing said ball against said valve seat.

4. A transmission fluid cooling system as recited in claim 1, further including a hollow bolt having an axial bore forming a portion of said supply line, said hollow bolt being inserted into said head portion of said supply banjo bolt, said hollow bolt including a transverse port disposed within said head portion of said supply banjo bolt, said transverse port providing fluid communication from said supply line into said head portion of said supply banjo bolt.

5. A transmission fluid cooling system comprising:
a transmission case;
a cooling unit;
a supply line leading from said transmission case to said cooling unit;
a return line leading from said cooling unit back to said transmission case;
a cooler-bypass unit mounted between said supply line and said return line, said cooler-bypass unit including a banjo bolt connected to said supply line, said banjo bolt including a head portion and a body portion, said head portion in fluid connection with said supply line, said body portion in fluid connection with said return line, said banjo bolt including a valve seat between said head portion and said body portion, said banjo bolt further including a ball within said body portion biased toward said head portion against said valve seat, said ball becoming unseated from said valve seat when pressure in said supply line exceeds a predetermined pressure to allow fluid to pass directly from said supply line to said return line, thereby bypassing said cooling unit;
a threaded hollow bolt having an axial bore forming a portion of said supply line, said hollow bolt being inserted into said head portion of said banjo bolt, said hollow bolt including a transverse port disposed within said head portion of said banjo bolt, said transverse port providing fluid communication from said supply line into said head portion of said banjo bolt said hollow bolt being inserted through said head portion of said banjo bolt and threaded into a fluid outlet of said transmission case.

6. A bypass unit for bypassing a fluid system comprising:
a supply banjo bolt relief valve including a head portion and a body portion, said supply banjo bolt relief valve further including a relief valve within said body portion, said relief valve permitting flow through said head portion and said body portion when pressure on said relief valve exceeds a predetermined pressure;
means for connecting one of said head portion or said body portion with a fluid return line, including a return banjo bolt having a head portion and a body portion and means for connecting said head portion of said return banjo bolt with a return line, said body portion of said return banjo bolt in fluid connection with said body portion of said supply banjo bolt; and
means for connecting the other of said head portion or said body portion of said
supply banjo bolt relief valve to a fluid supply line.

7. A bypass unit as recited in claim 6, further including a valve seat between said head portion and body portion of said supply banjo bolt, said relief valve comprising a ball within said body portion of said supply banjo bolt, said ball biased against said valve seat, said ball becoming unseated from said valve seat when said pressure exceeds a predetermined pressure to allow fluid to pass between said head portion and said body portion of said supply banjo bolt.

8. A bypass unit as recited in claim 6, wherein said means for connecting the other of said head portion or said body portion of said supply banjo bolt relief valve to a fluid supply line includes a hollow bolt having an axial bore, said hollow bolt being inserted into said head portion of said supply banjo bolt relief valve, said hollow bolt including a transverse port disposed within said head portion of said supply banjo bolt relief valve, said transverse port providing fluid communication from said axial bore into said head portion of said supply banjo bolt relief valve.

9. A bypass unit for bypassing a fluid system comprising:
a banjo bolt relief valve including a head portion and a body portion, said banjo bolt relief valve further including a relief valve within said body portion, said relief valve permitting flow through said head portion and said body portion when pressure on said relief valve exceeds a predetermined pressure, a valve seat at an outer end of said body portion, said relief valve comprising a ball within said body portion, said ball biased against said valve seat, said ball becoming unseated from said valve seat when pressure against said ball into said body portion exceeds a predetermined pressure to allow fluid to pass through said body portion and said head portion;
means for connecting one of said head portion or said body portion with a fluid return line; and
means for connecting the other of said head portion or said body portion to a fluid supply line.

10. A bypass unit for bypassing a transmission fluid cooler comprising:
a first banjo bolt including a head portion and a body portion, said first banjo bolt further including a relief valve within said body portion, said relief valve permitting flow through said head portion and said body portion when pressure on said relief valve exceeds a predetermined pressure, a valve seat at an outer end of said body portion, said relief valve comprising a ball within said body portion, said ball biased against said valve seat by a spring, said ball becoming unseated from said valve seat when pressure against said ball into said body portion exceeds a predetermined pressure to allow fluid to pass through said body portion and said head portion;
a first threaded hollow bolt having an axial bore, said first hollow bolt inserted into said head portion of said first banjo bolt, said first hollow bolt including a transverse port disposed within said head portion of said first banjo bolt, said transverse port providing fluid communication from said axial bore into said head portion of said first banjo bolt;
a second banjo bolt including a head portion;
a second threaded hollow bolt having an axial bore, said second hollow bolt inserted into said head portion of said second banjo bolt, said second hollow bolt including a transverse port disposed within said head portion of said second banjo bolt providing fluid communication from said axial bore into said head portion of said second banjo bolt;

bypass line providing fluid communication between said body portion of said first banjo bolt and said second banjo bolt.

* * * * *